(12) United States Patent
Taninaka et al.

(10) Patent No.: US 10,934,644 B2
(45) Date of Patent: Mar. 2, 2021

(54) NET-LIKE STRUCTURE HAVING EXCELLENT LOW RESILIENCE CHARACTERISTICS

(71) Applicant: TOYOBO CO., LTD., Osaka (JP)

(72) Inventors: Teruyuki Taninaka, Otsu (JP); Takahiro Kuramoto, Osaka (JP); Shinichi Kobuchi, Osaka (JP); Hiroyuki Wakui, Otsu (JP); Tatsushi Okamoto, Otsu (JP); Akifumi Yasui, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 184 days.

(21) Appl. No.: 15/548,505

(22) PCT Filed: Feb. 2, 2016

(86) PCT No.: PCT/JP2016/052986
§ 371 (c)(1),
(2) Date: Aug. 3, 2017

(87) PCT Pub. No.: WO2016/125766
PCT Pub. Date: Aug. 11, 2016

(65) Prior Publication Data
US 2018/0237968 A1 Aug. 23, 2018

(30) Foreign Application Priority Data
Feb. 4, 2015 (JP) .............................. JP2015-020580

(51) Int. Cl.
*D04H 3/037* (2012.01)
*A47C 27/12* (2006.01)
(Continued)

(52) U.S. Cl.
CPC ............. *D04H 3/037* (2013.01); *A47C 27/12* (2013.01); *B68G 11/02* (2013.01); *D04H 3/007* (2013.01);
(Continued)

(58) Field of Classification Search
CPC .......... D04H 3/037; D04H 3/14; D04H 3/011; D04H 3/016; D04H 3/007; D04H 3/16;
(Continued)

(56) References Cited

U.S. PATENT DOCUMENTS

| 5,639,543 A | 6/1997 | Isoda et al. |
| 2002/0041949 A1 | 4/2002 | Nishibori et al. |

(Continued)

FOREIGN PATENT DOCUMENTS

| CN | 101305027 A | 11/2008 |
| EP | 1858944 | 11/2007 |

(Continued)

OTHER PUBLICATIONS

Machine Translation of JP 2013-076199 A (Year: 2013).*
(Continued)

*Primary Examiner* — James C Yager
(74) *Attorney, Agent, or Firm* — Westerman, Hattori, Daniels & Adrian, LLP (57) ABSTRACT

To provide a net-like structure having excellent low resilience characteristics, cushioning properties, and durability. The net-like structure has a three-dimensional random loop bonded structure constituted of a continuous linear body made of a thermoplastic elastomer having a fiber diameter of 0.1-3.0 mm and a styrene content of 10-40 mass %, the net-like structure having an apparent density of 0.005-0.30 $g/cm^3$ and a 40° C. compression residual strain of less than or equal to 35%.

10 Claims, 1 Drawing Sheet

(51) Int. Cl.
*D04H 3/016* (2012.01)
*B68G 11/02* (2006.01)
*D04H 3/007* (2012.01)
*D04H 3/011* (2012.01)
*D04H 3/14* (2012.01)
*C08L 25/08* (2006.01)
*D04H 3/16* (2006.01)

(52) U.S. Cl.
CPC ............ *D04H 3/011* (2013.01); *D04H 3/016* (2013.01); *D04H 3/14* (2013.01); *C08L 25/08* (2013.01); *D04H 3/16* (2013.01); *Y10T 428/1352* (2015.01); *Y10T 428/1362* (2015.01)

(58) Field of Classification Search
CPC ..... B68G 11/02; A63B 21/0421; A47C 27/12; C08L 25/08; Y10T 428/1352; Y10T 428/1362
See application file for complete search history.

(56) References Cited

U.S. PATENT DOCUMENTS

| | | |
|---|---|---|
| 2006/0198983 A1 | 9/2006 | Patel |
| 2008/0146763 A1 | 6/2008 | Yamanaka et al. |
| 2013/0020016 A1 | 1/2013 | Takaoka |
| 2018/0117889 A1* | 5/2018 | Nakanishi ............... B32B 27/32 |

FOREIGN PATENT DOCUMENTS

| | | |
|---|---|---|
| EP | 2772576 A1 | 9/2014 |
| JP | 7-68061 A | 3/1995 |
| JP | 7-238458 A | 9/1995 |
| JP | 11-235481 A | 8/1999 |
| JP | 2002-61059 A | 2/2002 |
| JP | 2002-266223 A | 9/2002 |
| JP | 2003-250667 A | 9/2003 |
| JP | 2004-244740 A | 9/2004 |
| JP | 2006-200118 A | 8/2006 |
| JP | 2008-545066 A | 12/2008 |
| JP | 2013-76199 A | 4/2013 |
| JP | 2013-95853 A | 5/2013 |
| JP | 2014-189698 A | 10/2014 |
| WO | 2006/101929 A2 | 9/2006 |
| WO | 2012/029324 A1 | 3/2012 |

OTHER PUBLICATIONS

Conversion Table dtex to mm; Accessed at http://www.dss-textiles.com/yahoo_site_admin/assets/docs/conversion_table_for_yarn_dia_of_polyester_polyamide_6_66_and_12__polypropelene_and_polyethylene.15393100.pdf (Year: 2020).*
Extended (supplementary) European Search Report dated Jul. 23, 2018, issued in counterpart European Application No. 16746597.0. (6 pages).
International Search Report dated Apr. 12, 2016, issued in counterpart International Application No. PCT/JP2016/052986 (2 pages).
Office Action dated Nov. 13, 2018, issued in counterpart Chinese application No. 20168008297.3, with English translation. (9 pages).
Office Action dated Sep. 10, 2019, issued in counterpart JP application No. 2016-573363, with English translation. (11 pages).
Office Action dated May 19, 2020, issued in counterpart JP Application No. 2016-573363, with English translation (6 pages).
Luo, Hesheng, "Handbook of Plastic Materials (3rd Edition)", Guangzhou: Guangdong Science and Technology Press, Mar. 2010, with English Translation. (17 pages).
Office Action dated Jul. 20, 2020, issued in counterpart CN Application No. 201680008297.3, with English Translation. (13 pages).

* cited by examiner

NET-LIKE STRUCTURE HAVING EXCELLENT LOW RESILIENCE CHARACTERISTICS

TECHNICAL FIELD

The present invention relates to a net-like structure having excellent low resilience characteristics, cushioning properties, and durability, which can be suitably used for cushion materials used for office chairs, furniture, sofas, beddings such as bed pads and mattresses, seats for vehicles such as trains, automobiles, two-wheeled vehicles, baby buggies, and child safety seats, etc.; portable cushion materials carried in many occasions, such as sleeping bags and mats; and shock-absorbing mats such as floor mats and members for preventing collision and nipping.

BACKGROUND ART

At present, as cushion materials used for furniture, beddings, and seats for vehicles such as trains, automobiles, and two-wheeled vehicles, a net-like structure is increasingly used. PTDs 1 and 2 disclose net-like structures using a polyester-based thermoplastic elastomer and methods for manufacturing thereof. These structures are excellent in that they can solve problems originating from polyurethane, such as moisture and water permeability, air permeability, heat storage properties, VOC emission caused by unreacted chemicals, generation of poisonous gas in combustion, and difficulty in recycling. These net-like structures are excellent in high resilience characteristics originating from a polyester-based thermoplastic elastomer, and are widely used as high-resilience cushions.

PTD 3 discloses a low-resilience net-like structure using α-olefin. This is on its way to wider use as a net-like structure excellent in low resilience and low temperature characteristics. However, it is becoming difficult to achieve high cushioning performance and durability performance simultaneously, which has been required by users in recent years.

PTD 4 discloses a low-resilience net-like structure using a polymer alloy of a polyester-based thermoplastic elastomer and a styrene-based thermoplastic elastomer. In this disclosure, attention was focused on cushioning properties and vibration absorption properties, with no consideration being given to decreasing compression residual strain. Moreover, a polyester-based thermoplastic elastomer and a styrene-based thermoplastic elastomer are not good in compatibility, causing difficulty in manufacturing a good-quality net-like structure.

PTD 5 discloses a high-resilience net-like structure using a polymer alloy of polyolefin and styrene butadiene styrene. This has conventionally been implemented by using a styrene-based thermoplastic elastomer relatively excellent in durability and resilience, and it is impossible to obtain a net-like structure having both low resilience characteristics and durability according to the present invention.

CITATION LIST

Patent Document

PTD 1. Japanese Patent Laying-Open No. H7-68061
PTD 2: Japanese Patent Laying-Open No. 2004-244740
PTD 3: Japanese Patent Laying-Open No. 2006-200118
PTD 4: Japanese Patent Laying-Open No. 2013-95853
PTD 5: Japanese Patent Laying-Open No. 2002-61059

SUMMARY OF INVENTION

Technical Problems

In view of the problems of the background art described above, an object of the present invention is providing a net-like structure having excellent low resilience characteristics, cushioning properties, and durability.

Solutions to Problems

After having devoted themselves to researches for solving the above problems, the present inventors have finally completed the present invention, which includes the followings.

(1) A net-like structure having a three-dimensional random loop bonded structure constituted of a continuous linear body made of a thermoplastic elastomer having a fiber diameter of 0.1-3.0 mm and a styrene content of 10-40 mass %, the net-like structure having an apparent density of 0.005-0.30 g/cm$^3$ and a 40° C. compression residual strain of less than or equal to 35%.

(2) The net-like structure according to (1), wherein a residual strain after 80,000 times of constant displacement repeated compression is less than or equal to 15%.

(3) The net-like structure according to (1) or (2), wherein a hysteresis loss is 35-85%, a compression deflection coefficient is 2.5-85.0, and a thickness is 5-300 mm.

(4) The net-like structure according to any of (1) to (3), wherein the thermoplastic elastomer includes a styrene-based thermoplastic elastomer or an alloy of at least two kinds of styrene-based thermoplastic elastomers different in resin composition.

(5) The net-like structure according to any of (1) to (4), wherein a polyolefin-based thermoplastic elastomer is included in the thermoplastic elastomer.

(6) The net-like structure according to any of (1) to (5), wherein the net-like structure is used for a cushion material, a shock absorber, or a buffer.

Advantageous Effects of Invention

According to the present invention, a net-like structure having excellent low resilience characteristics, cushioning properties, and durability can be provided, which can be suitably used for: cushion materials used for office chairs, furniture, sofas, beddings such as bed pads and mattresses, seats for vehicles such as trains, automobiles, two-wheeled vehicles, baby buggies, and child safety seats, etc.; portable cushion materials carried in many occasions, such as sleeping bags and mats; and shock-absorbing mats such as floor mats and members for preventing collision and nipping.

DESCRIPTION OF EMBODIMENTS

The present invention will be described hereinafter in detail.

The present invention relates to a net-like structure having a three-dimensional random loop bonded structure constituted of a continuous linear body made of a thermoplastic elastomer of a predetermined component having a fiber diameter of 0.1-3.0 mm, the net-like structure having an apparent density of 0.005-0.30 g/cm$^3$ and a 40° C. compression residual strain of less than or equal to 35%.

The net-like structure of the present invention is a structure having a three-dimensional random loop bonded structure where a continuous linear body made of a thermoplastic elastomer of a predetermined component having a fiber diameter of 0.1-3.0 mm is curled to form random loops and the loops are brought into contact with one another in a molten state to be bonded together.

For the net-like structure of the present invention, a thermoplastic elastomer is used. The thermoplastic elastomer used for the present invention must have a styrene content of 10-40 mass %. If the styrene content is less than 10 mass %, the hard segment ratio of the thermoplastic elastomer will be so low that it will be difficult to impart the durability required for the net-like structure. If the styrene content exceeds 40 mass %, the hard segment ratio of the thermoplastic elastomer will be so high that it may be difficult to secure the low resilience required for the net-like structure. The styrene content of the thermoplastic elastomer is preferably 11-38 mass %, more preferably 12-30 mass %, even more preferably 13-25 mass %.

Examples of a styrene-based thermoplastic elastomer used as the thermoplastic elastomer according to the present invention include, as conjugate diene thermoplastic resins, SBS (styrene-butadiene-styrene copolymer) and SIS (styrene-isoprene-styrene copolymer) or, by addition of hydrogen to the above, SEBS (styrene-ethylene-butadiene-styrene copolymer) and SEPS (styrene-ethylene-propylene-styrene copolymer). These polymers can be obtained by a known living anion polymerization method described in Japanese Patent Laying-Open No. H11-130828, for example. Examples of the block shapes of these copolymers include a di-block copolymer, a tri-block copolymer, a multi-block copolymer, and a star-shaped copolymer. A tri-block copolymer is preferred from the viewpoint of durability.

As the styrene-based thermoplastic elastomer used for the present invention, the melt flow rate (MFR) measured at a temperature of 230° C. and a load of 21.18 N in conformity with JIS K7210 is preferably less than or equal to 30 g/10 min.

As the styrene-based thermoplastic elastomer used for the present invention, the rebound resilience defined in JIS K6255 is preferably less than or equal to 30%, more preferably less than or equal to 25%, even more preferably less than or equal to 20%, especially preferably less than or equal to 15%. If the rebound resilience exceeds 30%, it may be difficult to achieve the low resilience characteristics for the net-like structure.

It is a preferred embodiment to use an alloy of at least two kinds of styrene-based thermoplastic elastomers different in resin composition as the thermoplastic elastomer according to the present invention, because this resists occurrence of phase separation, thereby improving the quality, durability, and wear-and-tear resistance of the net-like structure.

It is also a preferred embodiment to use an alloy of a styrene-based thermoplastic elastomer and a polyolefin-based thermoplastic elastomer as the thermoplastic elastomer according to the present invention.

When a styrene-based thermoplastic elastomer and a polyolefin-based thermoplastic elastomer are combined to form an alloy as the thermoplastic elastomer according to the present invention, it is preferred to combine a styrene-based thermoplastic elastomer in a larger proportion. The resin ratio of the polyolefin-based thermoplastic elastomer is preferably 1-30 mass %, more preferably 1-25 mass %, even more preferably 2-20 mass %, especially preferably 3-15 mass %.

As the polyolefin-based thermoplastic elastomer used for the present invention, the density is preferably 0.86-0.94 g/cm$^3$, and examples of such thermoplastic elastomers include: homopolymers obtained by single polymerization such as polyethylene and polypropylene; and random polymers and block polymers respectively obtained by random- and block-copolymerization of ethylene, propylene, etc. For the polyolefin-based thermoplastic elastomer according to the present invention, copolymerization methods described in Japanese Patent Laying-Open No. H6-293813 and Japanese Patent Laying-Open No. 2003-147157 may be used, for example. The polyolefin-based thermoplastic elastomer according to the present invention is preferably an α-olefin copolymer resin constituted of ethylene, propylene, or α-olefin having 4 or more carbons. Examples of α-olefin having 4 or more carbons include 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene. Preferred are 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene. Also, two or more kinds of them can be used. Such ethylene or α-olefin having 4 or more carbons is normally copolymerized by 0-30 wt %. This copolymer can be obtained by copolymerizing ethylene or propylene and α-olefin using a specific Ziegler-Natta catalyst or metallocene catalyst.

As the polyolefin-based thermoplastic elastomer used for the present invention, the melt flow rate (MFR) measured at a temperature of 230° C. and a load of 21.18 N in conformity with JIS K7210 is preferably 0.1-100 g/10 min.

As required, two or more kinds of the above polymers can be combined to form an alloy. Moreover, the followings can be added: phthalate ester-based, trimellitate ester-based, aliphatic acid-based, epoxy-based, adipate ester-based, polyester-based, paraffin-based, naphthene-based, and aromatic-based plasticizers; known hindered phenol-based, sulfur-based, phosphorous-based, and amine-based antioxidants; hindered amine-based, triazole-based, benzophenone-based, benzoate-based, nickel-based, salicyl-based, and other light stabilizers; antistatic agents; cross-linkers such as peroxides; compounds having a reactive group such as triallyl isocyanurate, epoxy-based compounds, isocyanate-based compounds, and carbodiimide-based compounds; metal deactivators, organic and inorganic nucleating agents; neutralizers; antacids; antimicrobial agents; fluorescent whiteners; fillers; flame retardants; flame retardant auxiliaries; and organic and inorganic pigments. It is also effective to increase the molecular weight of the thermoplastic resin to improve heat resistance, durability, and wear-and-tear resistance.

As an antioxidant, it is desirable to add at least one kind selected from a known phenol-based antioxidant, a phosphite-based antioxidant, a thioether-based antioxidant, a benzotriazole-based UV absorber, a triazine-based UV absorber, a benzophenone-based UV absorber, an N—H type hindered amine-based light stabilizer, and an N—CH$_3$ type hindered amine-based light stabilizer.

Examples of the phenol-based antioxidant include 1,3,5-tris[[3,5-bis(1,1-dimethylethyl)-4-hydroxyphenyl]methyl]-

1,3,5-triazine-2,4,6(1H,3H,5H)-trione, 1,1,3-tris(2-methyl-4-hydroxy-5-tert-butylphenyl)butane, 4,4'-butylidenebis(6-tert-butyl-m-cresol), 3-(3,5-di-tert-butyl-4-hydroxyphenyl) propionic acid stearyl, pentaerythritol tetrakis[3-(3,5-di-tert-butyl-4-hydroxyphenyl)propionate], Sumilizer AG 80, and 2,4,6-tris(3',5'-di-tert-butyl-4'-hydroxybenzyl)mesitylene.

Examples of the phosphite-based antioxidant include 3,9-bis(octadecyloxy)-2,4,8,10-tetraoxa-3,9-diphosphaspiro [5.5]undecane, 3,9-bis(2,6-di-tert-butyl-4-methylphenoxy-2,4,8,10-tetraoxa-3,9-diphosphaspiro[5.5]undecane, 2,4,8, 10-tetrakis(1,1-dimethylethyl)-6-[(2-ethylhexyl)oxy]-12H-dibenzo[d,g][1,3,2]dioxaphosphocin, tris(2,4-di-tert-butylphenyl)phosphite, tris(4-nonylphenyl)phosphite, 4,4'-isopropylidenediphenol C12-15 alcohol phosphite, diphenyl (2-ethylhexyl)phosphite, diphenyl isodecyl phosphite, triisodecyl phosphite, and triphenyl phosphite.

Examples of the thioether-based antioxidant include bis [3-(dodecylthio)propionate]2,2-bis[[3-(dodecylthio)-1-oxopropyloxy]methyl]-1,3-pr opanediyl and 3,3'-ditridecyl thiobispropionate.

A lubricant is selected from hydrocarbon-based waxes, higher alcohol-based waxes, amide-based waxes, ester-based waxes, metal soap, etc. The lubricant may not be added, but, if added, the content is preferably less than or equal to 0.5 mass %.

The thermoplastic elastomer constituting the net-like structure of the present invention having excellent low resilience characteristics, cushioning properties and durability preferably has an endothermic peak at a temperature less than or equal to the melting point or the glass transition temperature of hard segments in a melting curve measured with a differential scanning type calorimeter. The heat and wear-and-tear resistance significantly improves in an elastomer having an endothermic peak at a temperature less than or equal to the melting point or the glass transition temperature of hard segments compared with an elastomer having no such endothermic peak. A net-like structure having an endothermic peak at a temperature less than or equal to the melting point or the glass transition temperature of hard segments can be obtained by performing annealing treatment: the heat and wear-and-tear resistance improves by performing annealing treatment at a temperature that is lower than the melting point or the glass transition temperature of hard segments by at least 5° C. or more and higher than or equal to room temperature. While the annealing treatment is satisfactory by heating a sample at a temperature lower than the melting point or the glass transition temperature of hard segments by at least 5° C. or more, the heat and wear-and-tear resistance will further improve by providing compression strain. The thus-treated net-like structure exhibits an endothermic peak more clearly at a temperature greater than or equal to room temperature and less than or equal to the melting point in the melting curve measured with a differential scanning type calorimeter. Two or more such endothermic peaks may be present, or a shoulder-like endothermic peak may appear. It should be noted that, when no annealing is performed, an endothermic peak is not be exhibited clearly at a temperature greater than or equal to room temperature and less than or equal to the melting point or the glass transition temperature of hard segments in the melting curve. From this, it is considered that, by annealing, a metastable intermediate phase where the hard segments are rearranged is formed, whereby the heat and wear-and-tear resistance improves. As usages of the heat resistance improving effect according to the present invention, applications in environments where the temperature may become comparatively high, such as cushions for vehicles where a heater is used and flooring mats for heated floors, are useful because the wear-and-tear resistance is good.

When a polymer alloy is used as the thermoplastic elastomer according to the present invention, the low resilience characteristics and the durability may become considerably good by performing annealing treatment. This mechanism is not necessarily clarified, but one of hypotheses is as follows. In the styrene-based thermoplastic elastomer having low resilience characteristics, the solubility parameters of hard segments and soft segments are close to each other in many cases. It is therefore considered hard to form a metastable structure. With this as a background, it is considered difficult to achieve the durability according to the present invention with single use of the styrene-based thermoplastic elastomer having low resilience characteristics. In view of this, according to the present invention, a polyolefin-based thermoplastic elastomer having comparatively excellent compatibility with soft segments is combined to form a polymer alloy structure that is easy to form a thermodynamically metastable structure. Moreover, by heating, rearrangement of soft segments and hard segments is facilitated, allowing the alloy polymer to form a metastable structure. It is considered that this has made it possible to improve the low resilience properties and the durability.

The fiber diameter of a continuous linear body constituting the net-like structure of the present invention is 0.1-3.0 mm, preferably 0.2-2.5 mm. If the fiber diameter is less than 0.1 mm, the linear body will be so fine that, while compactness and soft touch are good, it will be difficult to secure the hardness required for the net-like structure. If the fiber diameter exceeds 3.0 mm, while the hardness of the net-like structure may be sufficiently secured, the net-like structure may be coarse, degrading other cushioning performance.

The apparent density of the net-like structure of the present invention is 0.005-0.30 $g/cm^3$, preferably 0.01-0.28 $g/cm^3$, more preferably 0.02-0.25 $g/cm^3$. If the apparent density is smaller than 0.005 $g/cm^3$, the required hardness cannot be secured when the net-like structure is used as a cushion material. If the apparent density exceeds 0.30 $g/cm^3$, the structure may be too hard to be suitable for a cushion material.

The 40° C. compression residual strain of the net-like structure of the present invention is less than or equal to 35%, preferably less than or equal to 34%, more preferably less than or equal to 32%, even more preferably less than or equal to 30%, especially preferably less than or equal to 25%, most preferably less than or equal to 23%. If the 40° C. compression residual strain exceeds 35%, the required durability may not be obtained. The lower limit of the 40° C. compression residual strain is not particularly limited, but is 1% or more for the net-like structure obtained according to the present invention.

The residual strain after 80,000 times of constant displacement repeated compression of the net-like structure of the present invention is preferably less than or equal to 15%, more preferably less than or equal to 13%, even more preferably less than or equal to 10%, especially preferably less than or equal to 8%, especially further preferably less than or equal to 7%, most preferably less than or equal to 5%. If the residual strain after 80,000 times of constant displacement repeated compression exceeds 15%, the required durability may not be obtained. The lower limit of the residual strain after 80,000 times of constant displacement repeated compression is not particularly limited, but is 1% or more for the net-like structure obtained according to the present invention.

The hysteresis loss of the net-like structure of the present invention is preferably 35-85%, more preferably 36-84%, even more preferably 38-83%, especially preferably 40-80%. If the hysteresis loss is less than 35%, it may be difficult to attain desired low resilience characteristics. If the hysteresis loss exceeds 85%, the recoverability may decrease, failing to obtain a suitable cushioning feeling.

The compression deflection coefficient of the net-like structure of the present invention is preferably 2.5-85.0, more preferably 2.6-70.0, even more preferably 2.7-60.0, especially preferably 2.8-50.0, most preferably 3.0-40.0. If the compression deflection coefficient is less than 2.5, depression against a load will be small, causing an insufficient stroke feeling, whereby a cushioning feeling may be insufficient. If the compression deflection coefficient exceeds 85.0, the change in hardness with compression is so great that a bottom touch feeling may be felt.

The thickness of the net-like structure of the present invention is preferably 5-300 mm, more preferably 10-200 mm, even more preferably 15-120 mm. If the thickness is less than 5 mm, a cushion material will be so thin when the structure is used for the cushion material, that a suitable cushion feeling may be lost. The upper limit of the thickness is preferably 300 mm or less from the viewpoint of manufacturing equipment.

Differences of the net-like structure of the present invention from the conventionally known net-like structures are as follows. The net-like structure of the present invention has achieved appropriate cushioning performance and durability while having low resilience characteristics. By using, as the thermoplastic elastomer constituting the net-like structure, an alloy of at least two kinds of styrene-based thermoplastic elastomers different in resin composition or an alloy of a styrene-based thermoplastic elastomer and a polyolefin-based thermoplastic elastomer, suitable polymer designing has been made to obtain low resilience characteristics, high durability, and low die swell. Furthermore, to enhance durability and cushioning properties, fusion between continuous linear bodies constituting the net-like structure has been strengthened thereby increasing the strength of the contact points of the continuous linear bodies, and to further improve the low resilience characteristics and the durability, annealing treatment has been performed.

In the net-like structure of the present invention, by using, as the thermoplastic elastomer constituting the net-like structure, an alloy of at least two kinds of styrene-based thermoplastic elastomers different in resin composition or an alloy of a styrene-based thermoplastic elastomer and a polyolefin-based thermoplastic elastomer, a hysteresis loss of 35-85% and a compression deflection coefficient of 2.5-85.0 have been achieved, a fiber diameter of a continuous linear body of 0.1-3.0 mm, an apparent density of the net-like structure of 0.005-0.30 g/cm³, and a thickness of 5-300 mm have been obtained to achieve appropriate cushioning properties, and a 40° C. compression residual strain of less than or equal to 35% and a residual strain after 80,000 times of constant displacement repeated compression of less than or equal to 15% have been obtained to achieve the required durability. In other words, compared with the conventionally known net-like structures, the net-like structure of the present invention has a high hysteresis loss, exhibiting excellent low resilience characteristics, and yet is high in compression deflection coefficient, exhibiting excellent cushioning properties, and low in 40° C. compression residual strain and residual strain after 80,000 times of constant displacement repeated compression, exhibiting excellent durability. In particular, use of a styrene-based thermoplastic elastomer having a styrene content of greater than or equal to 40 wt % increases the size of hard components that exhibit durability, thereby improving the durability. This is therefore a preferred embodiment.

The net-like structure of the present invention having excellent low resilience characteristics, cushioning properties, and durability is obtained in the following manner, for example. The net-like structure is obtained based on a known method described in Japanese Patent Laying-Open No. H7-68061, etc. For example, a styrene-based thermoplastic elastomer, an alloy of at least two kinds of styrene-based thermoplastic elastomers different in resin composition, or a polymer alloy of a styrene-based thermoplastic elastomer and a polyolefin-based thermoplastic elastomer is distributed to nozzle orifices from a multi-row nozzle having a plurality of orifices, and discharged downward from the nozzle at a spinning temperature higher than the melting point of the thermoplastic elastomer or the glass transition temperature of hard segments by a temperature more than or equal to 20° C. and less than 200° C. Continuous linear bodies are brought into contact with one another in a molten state and fused together to form a three-dimensional structure, which is simultaneously sandwiched by take-up conveyer nets, cooled with cooling water in a cooling bath, then drawn out, and drained or dried, to obtain a net-like structure with both surfaces or one surface smoothed. When only one surface is to be smoothed, the elastomer may be discharged onto an inclined take-up net, and continuous linear bodies may be brought into contact with one another in a molten state and fused together to form a three-dimensional structure, which may be simultaneously cooled while the form of only the take-up net surface is relaxed. Thereafter, the obtained net-like structure can also be subjected to drying treatment. Note that the drying treatment of the net-like structure may be regarded as annealing treatment.

For annealing treatment, a device such as a hot-air drying oven and a hot-air circulating oven can be used. The annealing temperature and the annealing time are preferably limited into predetermined ranges. The annealing temperature is greater than or equal to room temperature, preferably greater than or equal to 50° C., more preferably greater than or equal to 60° C., even more preferably greater than or equal to 70° C. The upper limit of the annealing temperature is not particularly limited, but preferably lower than the melting point or the glass transition temperature of hard segments by a temperature greater than or equal to 10° C. The annealing treatment is preferably performed in a nitrogen atmosphere. The annealing time is preferably greater than or equal to 1 minute, more preferably greater than or equal to 5 minutes, even more preferably greater than or equal to 10 minutes, especially preferably greater than or equal to 20 minutes.

As another means for obtaining the net-like structure of the present invention, a heat-retaining region may be provided below the nozzle when the thermoplastic elastomer is spun out, for example. It is also considered to increase the spinning temperature of the thermoplastic elastomer. However, from the viewpoint of preventing thermal degradation of the polymer, the means of providing a heat-retaining region below the nozzle is preferred. The length of the heat-retaining region below the nozzle is preferably greater than or equal to 20 mm, more preferably greater than or equal to 35 mm, even more preferably greater than or equal to 50 mm. The upper limit of the length of the heat-retaining region is preferably 70 mm or less. Having a length of the heat-retaining region of greater than or equal to 20 mm, the fusion of the continuous linear bodies of the obtained net-like structure becomes strong, increasing the strength of the contact points of the continuous linear bodies. As a result, the repeated compression durability of the net-like structure can be improved. If the length of the heat-retaining region is less than 20 mm, the strength of the contact points will not be improved to such an extent that satisfactory repeated compression durability is obtained. If the length of the heat-retaining region exceeds 70 mm, the surface quality may be deteriorated, and not preferable.

The heat-retaining region can be formed using a periphery of a spin pack or a heat quantity carried by the polymer, or the heat-retaining region may be heated with a heater to control the temperature in a fiber falling region immediately below the nozzle. In the heat-retaining region, an iron plate, an aluminum plate, a ceramic plate, etc. may be used to form a heat-retaining body so as to surround the circumference of falling continuous linear bodies below the nozzle. More preferably, the heat-retaining body is formed of the above materials, and these materials may be covered with a heat insulating material. As the position of the heat-retaining region, the heat-retaining region is preferably provided downward from a position less than or equal to 50 mm below the nozzle, more preferably from a position less than or equal to 20 mm below the nozzle, even more preferably from immediately below the nozzle, considering the heat retaining effect. As one of preferred embodiments, a periphery of a region immediately below the nozzle is surrounded with an aluminum plate over a length of 20 mm downward from immediately below the nozzle so as not to be in contact with filaments, thereby retaining heat, and further the aluminum plate is covered with a heat-retaining material.

A preferred method is combining the above methods appropriately to obtain a net-like structure of the present invention having excellent low resilience characteristics, cushioning properties, and durability.

The continuous linear body constituting the net-like structure of the present invention may be combined with another thermoplastic resin to form a complex linear body within the bounds of not impairing the object of the present invention. When the linear body itself is complexed, examples of the complexed form include complex linear bodies of sheath core type, side-by-side type, and eccentric sheath core type.

The net-like structure of the present invention may have a multilayer structure within the bounds of not impairing the object of the present invention. Examples of the multilayer structure include a structure where the top and back surface layers are constituted of continuous linear bodies different in fiber diameter and a structure where the top and back surface layers have different apparent densities. Examples of the method for forming a multilayer structure include a method of stacking a net-like structure on top of another and fixing them with a side ground, etc., a method of fusing and fixing net-like structures by heating, a method of bonding net-like structures with an adhesive, and a method of binding net-like structures by sewing or a band.

The cross-sectional shape of the continuous linear body constituting the net-like structure of the present invention is not particularly limited, but when a hollow cross section, a modified cross section, or a hollow modified cross section is formed, preferred compression resistance and touch can be imparted.

The net-like structure of the present invention can be processed into a molded body from a resin manufacturing process within the bounds of not deteriorating the performance, and at any given stage of commercialization, treatment/processing such as addition of chemicals can be performed to impart functions such as antibacterial deodorization, deodorization, mold prevention, coloring, fragrance, flame resisting, and absorption and desorption of moisture.

The thus-obtained net-like structure of the present invention is excellent in low resilience characteristics, cushioning properties, and durability. Low-resilience urethane mats and cushions, for example, are excellent in low resilience characteristics and durability, but inferior in permeability, and therefore may become wet after a long time use. In particular, in summer in which the outside air temperature and humidity are high, the comfort may be impaired. Also, the conventional low-resilience net-like structures sometimes found difficulty in satisfying both comfort to sit on and durability simultaneously. When the net-like structure of the present invention is used as a mat and a cushion, the resultant product resists from becoming wet because the permeability is excellent, and can provide comfort to sit on because the good low resilience characteristics give an effect of fitting to the user's body. Moreover, having the conventional high durability, the user can continue sitting for a longer time without impairment of the comfort to sit on.

EXAMPLES

While the present invention will be described hereinafter in detail with reference to examples, the present invention is not limited to these examples. Measurement and evaluation of property values in examples were performed in the following manners. Note that, while the sizes of samples described below are considered standard, a possible sample size was used for measurement when the quantity of samples is insufficient.

(1) Fiber Diameter

A sample was cut into a size of 5 cm×5 cm×thickness, and 10 linear bodies were collected by a length of about 5 mm randomly in the thickness direction from the cut cross section. The collected linear bodies were cut in a slicing direction, and a fiber cross section was observed with an optical microscope with an appropriate magnification, to measure the fiber diameter (average of n=10).

(2) Hollowness

A sample was cut into a size of 5 cm×5 cm×thickness, and 10 linear bodies with a hollow cross section were collected randomly in the thickness direction from a cut cross section in a region of the sample other than the ranges within 10% from both surfaces of the sample in the thickness direction. The collected linear bodies were cut in a slicing direction, and placed on cover glass in a standing state along the fiber axis, to obtain a fiber cross-sectional picture in a slicing direction with an optical microscope. From the cross-sectional picture, a hollow part area (a) and the total area (b) of the fiber including the hollow part were determined, to calculate the hollowness according to the following formula.

$$(\text{Hollowness}) = (a)/(b) \text{ (unit: \%, average of } n=10)$$

(3) Density

A resin was cut into a size of about less than or equal to 5 mm cube to obtain a sample, which was sufficiently degassed by ultrasonic and vacuuming, and gently immersed into a density gradient tube with a temperature controlled at 30° C. After 5 hours, with a float as a reference, the density was calculated (average of n=5). Note that, when the density of a resin was to be calculated from a net-like structure, the same procedure as the measurement of the resin was followed except that a linear body portion was cut into a length of about 3 mm and the cut piece was used as a sample.

(4) Sample Thickness and Apparent Density

A sample was cut into a size of 8 cm×10 cm×thickness to obtain 4 samples, and the samples were left standing with no load for 24 hours. Thereafter, the height at one point of each sample was measured using a circular probe having an area of 15 cm² with a thickness gauge Model FD-80N manufactured by Kobunshi Keiki Co., Ltd., and the average of the measured values was determined as the sample thickness. The sample weight was measured by placing the sample on an electronic balance. The volume was determined from the sample thickness, and the sample weight was divided by the volume to obtain a value as the apparent density (average of n=4 each).

(5) Melting Point (Tm)

A heat absorption peak (melting peak) temperature was determined from an endothermic/exothermic curve measured from room temperature at a temperature rise rate of 20° C./min using a differential scanning calorimeter (DSC) Q200 manufactured by TA Instruments.

(6) Glass Transition Temperature (Tg)

A change start point of a base line observed when the temperature was raised from 0° C. to 200° C. at a temperature rise/fall rate of 20° C./min, retained at 200° C. for 2 minutes, and thereafter decreased to 0° C. using the differential scanning calorimeter (DSC) Q200 manufactured by TA Instruments was determined as the glass transition temperature of hard segments. Note however that, when two or more points were observed, a higher change start temperature was determined as the glass transition temperature.

(7) Styrene Content

The styrene content was determined by $^1$H-NMR measurement at a resonant frequency 500 MHz. As the measuring apparatus, AVANCE 500 manufactured by Bruker was used, and as the solvent, heavy tetrachloroethane with dimethyl isophthalate added thereto was used as a weight reference material. A sample was dissolved in this solvent at 135° C., and measurement was performed at 120° C. The repetition time was sufficiently given.

Measurement was performed according to the above-described method, and the styrene content was determined in the following manner.

A peak of 6.4-7.3 ppm observed when tetrachloroethane is 6 ppm is the peak corresponding to styrene. For analysis, the integration value (=A) of this peak is used. As for dimethyl isophthalate, peaks are observed near 8.7 (1H), 8.35 (2H), 7.6 (1H), and 4.0 ppm (6H). Among them, the integration value of a peak that does not overlap with those of components of the sample is used. Assuming that the peak of 7.6 ppm (integration value=B) is used, the styrene content can be calculated according to the following formula.

$$(20.8 \times A \times Y \times 100)/(194 \times B \times X) \text{ (mass \% vs sample)}$$

*X (mg) is the amount of the sample, and Y (mg) is the weight of dimethyl isophthalate contained in the measured solution (8) 40° C. Compression Residual Strain A sample was cut into a size of 8 cm×10 cm×thickness, and the cut sample was measured for a thickness (c) before treatment according to the method described in (4). The thickness-measured sample was sandwiched by a tool capable of holding the sample in a 50% compression state, placed in a dryer set at 40±2° C., and left standing for 22 hours. Thereafter, the sample was taken out, relieved of a compression strain, and cooled at room temperature. A thickness (d) after standing for 30 minutes was then determined. From the thickness (c) before treatment and the thickness (d), 40° C. compression residual strain was calculated according to formula {(c)−(d)}/(c)×100 (unit: %, average of n=3).

(9) 25% and 65% Compression Hardness

A sample was cut into a size of 8 cm×10 cm×thickness, and the cut sample was left standing under an environment of 23° C.±2° C. with no load for 24 hours. The sample was then placed in a universal tester (Instron universal tester manufactured by Instron Japan Co., Ltd.) that was under an environment of 23±2° C. so that the sample was in the center with respect to a φ50 mm, 3 mm-thick compression board. Compression was then started for the center of the sample at a speed of 10 mm/min, and the thickness at the time when the universal tester detected a load of 0.3±0.05 N was measured as a hardness meter thickness. With the position of the compression board at this time regarded as a zero point, the sample was compressed to 75% of the hardness meter thickness at a speed of 100 mm/min, then the compression board was returned to the zero point at a speed of 100 mm/min, and this state was held for 4 minutes. After a lapse of 4 minutes, the sample was compressed to 25% and 65% of the hardness meter thickness at a speed of 100 mm/min, and the loads at these times were measured as a 25% compression hardness and a 65% compression hardness, respectively (unit: N/φ50, average of n=3).

(10) Compression Deflection Coefficient

The compression deflection coefficient was calculated according to the following formula using the 25% compression hardness (e) and the 65% compression hardness (f) both measured in (9).

$$(\text{Compression deflection coefficient})=(f)/(e):(\text{average of } n=3)$$

(11) Residual Strain after 80,000 Times of Constant Displacement Repeated Compression (50% Constant Displacement Repeated Compression Residual Strain)

A sample was cut into a size of 8 cm×10 cm×thickness, and the cut sample was measured for a thickness (g) before treatment according to the method described in (4). The thickness-measured sample was sandwiched between compression boards having a size of 30 cm×30 cm and a thickness of 20 mm so that the sample was in the center in Servopulser manufactured by Shimadzu Corporation under an environment of 23±2° C. The sample was repeatedly compressed to a thickness of 50% of the thickness before treatment and restored in a cycle of 1 Hz, applying 80,000-time cycle load. The sample after 80,000 times of repeated compression was taken out from Servopulser, and left standing for 30 minutes. A thickness (h) after treatment was then determined according to the method described in (4). From the thickness (g) before treatment and the thickness (h), the residual strain was calculated according to formula {(g)−(h)}/(g)×100 (unit: %, average of n=3).

(12) Hysteresis Loss

A sample was cut into a size of 8 cm×10 cm×thickness, and the cut sample was left standing under an environment of 23° C.±2° C. with no load for 24 hours. The sample was then placed in a universal tester (Instron universal tester manufactured by Instron Japan Co., Ltd.) that was under an environment of 23±2° C. so that the sample was in the center with respect to a φ50 mm, 3 mm-thick compression board. Compression was started for the center of the sample at a speed of 10 mm/min, and the thickness at the time when a load of 0.3±0.05 N was detected by the universal tester was measured as a hardness meter thickness. With the position of the compression board at this time regarded as a zero point, the sample was compressed to 75% of the hardness meter thickness at a speed of 100 mm/min, then the compression board was returned to the zero point at the same speed with no hold time, and this state was held for 4 minutes (first stress-strain curve). After the 4-minute holding at the zero point, the sample was compressed to 75% of the hardness meter thickness at a speed of 100 mm/min, and the compression board was returned to the zero point at the same speed with no hold time (second stress-strain curve).

Using a compression energy (WC) indicated by a second compression stress curve and a compression energy (WC') indicated by a second decompression stress curve, hysteresis loss was determined according to the following formula.

Hysteresis loss (%)=(WC−WC')/WC×100

WC=∫PdT (workload at compression from 0% to 75%)

WC'=∫PdT (workload at decompression from 75% to 0%)

Figure 1:
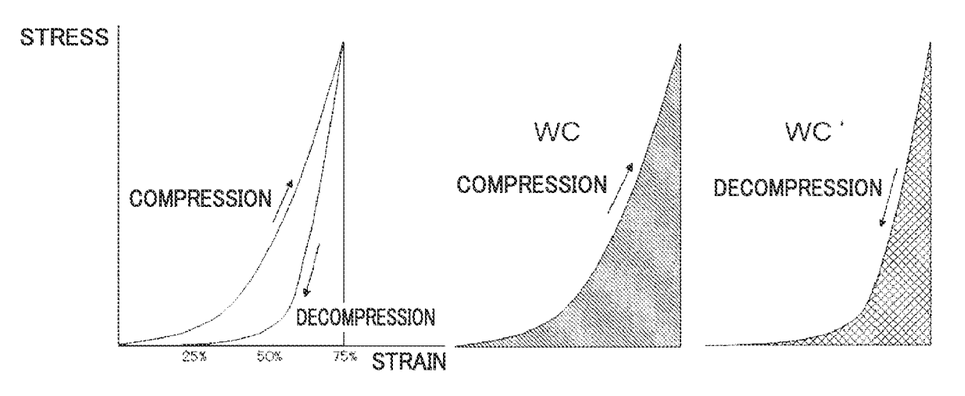
FIG. 1 is a schematic graph of compression/decompression tests in hysteresis loss measurement of a net-like structure.

As a simplified way, when a stress-strain curve as shown in FIG. 1, for example, is obtained, the hysteresis loss can be calculated by data analysis using a personal computer. As another way, with the area of the hatched portion being defined as WC and the area of the double-hatched portion as WC', the difference between the areas can be determined from the weight of the cut-out portion (average of n=3).

[Thermoplastic Elastomer Used in Examples]

A styrene-based thermoplastic elastomer was obtained in the following manner: styrene and 2-butene or isoprene were polymerized by a known method, and the resultant polymers were kneaded with 0.5% of an antioxidant and then pelletized to obtain styrene-based thermoplastic elastomers A-1 and A-2. Styrene-based thermoplastic elastomer A-1 had a styrene copolymerization ratio of 19.7 mass %, an isoprene copolymerization ratio of 80.3 mass %, and a density of 0.935 g/cm$^3$. As a result of measurement of the melting point and the glass transition temperature using a differential scanning calorimeter (DSC), no definite melting point was found, and the glass transition temperature of hard segments was 81° C. Styrene-based thermoplastic elastomer A-2 had a styrene copolymerization ratio of 41.3 mass %, a 2-butene copolymerization ratio of 30.3 mass %, a butene copolymerization ratio of 28.4 mass %, and a density of 0.985 g/cm$^3$. No definite melting point was found, and the glass transition temperature of hard segments was 79° C.

A polyolefin-based thermoplastic elastomer was obtained in the following manner: using a metallocene compound as a catalyst, propylene and ethylene were polymerized by a known method, and the resultant polymers were kneaded/mixed with 0.5 mass % of an antioxidant and then pelletized to obtain polyolefin-based thermoplastic elastomers B-1 to B-3. Polyolefin-based thermoplastic elastomer B-1 had 100 mass % of propylene, a density of 0.88 g/cm$^3$, and a melting point of 162° C. Polyolefin-based thermoplastic elastomer B-2 had 95.3 mass % of propylene, an ethylene copolymerization ratio of 4.7 mass %, a density of 0.89 g/cm$^3$, and a melting point of 133° C. Polyolefin-based thermoplastic elastomer B-3 had 98.5 mass % of propylene, an ethylene copolymerization ratio of 1.5 mass %, a density of 0.90 g/cm$^3$, and a melting point of 124° C.

A polyester-based thermoplastic elastomer was obtained in the following manner: dimethyl terephthalate (DMT), 1,4-butanediol (1,4-BD), and polytetramethylene glycol (PTMG, average molecular weight: 1000) were put together with a small amount of catalyst, and, after ester exchange by a usual way, subjected to polycondensation while temperature rise and decompression were continuing, to produce a polyester-ether block copolymerized elastomer with DMT/1,4-BD/PTMG=100/88/12 mol %. The resultant elastomer was then kneaded and mixed with 1% of antioxidant, then pelletized, and dried in a vacuum at 50° C. for 48 hours, to obtain a polyester-based thermoplastic elastomer C-1 having a density of 1.17 g/cm$^3$ and a melting point of 205° C.

Example 1

Ninety mass % of Styrene-based thermoplastic elastomer A-1 and 10 mass % of polyolefin-based thermoplastic elastomer B-2 were measured and mixed well in a pellet state to be used as a raw material. The material was put into a nozzle having orifices with a hole diameter of 1 mm zig-zag arranged with an inter-hole pitch of 6 mm on a nozzle effective face having a width of 96 mm and a width in the thickness direction of 31.2 mm, and discharged downward from the nozzle at a spinning temperature of 240° C. at a single-hole discharge rate of 1.0 g/min. Cooling water was provided at a position 24 cm below the nozzle face, and a 50 mm-long heat-retaining cylinder was placed immediately below the nozzle between the nozzle and the cooling water. Endless nets made of stainless steel each having a width of 300 mm were placed in parallel at a spacing of 20 mm in opening width to form a pair of take-up conveyors so as to be partially exposed over a water surface. The discharged filaments in a molten state were curled to form loops, and contact portions were fused together to form a three-dimensional net-like structure. The net-like structure in a molten state was sandwiched at both surfaces by the take-up conveyors, and drawn into the cooling water at a speed of 1.0 m per minute, thereby solidified, flattened at both surfaces, then cut into a predetermined size, and annealed with 70° C. hot air for 30 minutes, to obtain a net-like structure.

The obtained net-like structure was formed of linear bodies having a circular cross-sectional shape and a fiber diameter of 0.4 mm. The net-like structure had an apparent density of 0.070 g/cm$^3$, a thickness of flattened surface of 20 mm, a 40° C. compression residual strain of 32.4%, a residual strain after 80,000 times of constant displacement repeated compression of 6.2%, a hysteresis loss of 66.1%, a 25% compression hardness of 5 N/φ50 mm, a 65% compression hardness of 32 N/φ50 mm, and a compression deflection coefficient of 6.4. The properties of the obtained net-like structure are shown in Table 1. The obtained net-like structure satisfied the requirements of the present invention, and had excellent low resilience characteristics, cushioning properties, and durability.

Example 2

A net-like structure was obtained in the same manner as in Example 1 except that no heat-retaining cylinder was used during the spinning.

The obtained net-like structure was formed of linear bodies having a circular cross-sectional shape and a fiber diameter of 0.4 mm. The net-like structure had an apparent density of 0.071 g/cm$^3$, a thickness of flattened surface of 20 mm, a 40° C. compression residual strain of 34.6%, a residual strain after 80,000 times of constant displacement repeated compression of 6.9%, a hysteresis loss of 67.1%, a 25% compression hardness of 4 N/φ50 mm, a 65% compression hardness of 30 N/φ50 mm, and a compression deflection coefficient of 7.5. The properties of the obtained net-like structure are shown in Table 1. The obtained net-like structure satisfied the requirements of the present invention, and had excellent low resilience characteristics, cushioning properties, and durability.

Example 3

A net-like structure was obtained in the same manner as in Example 1 except that 70 mass % of styrene-based thermoplastic elastomer A-2 and 30 mass % of polyolefin-based thermoplastic elastomer B-1 were measured and mixed well in a pellet state to be used as a raw material and that the nozzle face-cooling water distance was 18 cm.

The obtained net-like structure was formed of linear bodies having a circular cross-sectional shape and a fiber diameter of 0.8 mm. The net-like structure had an apparent density of 0.068 g/cm$^3$, a thickness of flattened surface of 21 mm, a 40° C. compression residual strain of 31.4%, a residual strain after 80,000 times of constant displacement repeated compression of 6.5%, a hysteresis loss of 46.5%, a 25% compression hardness of 12 N/φ50 mm, a 65% compression hardness of 55 N/φ50 mm, and a compression deflection coefficient of 4.6. The properties of the obtained net-like structure are shown in Table 1. The obtained net-like structure satisfied the requirements of the present invention, and had excellent low resilience characteristics, cushioning properties, and durability.

Example 4

A net-like structure was obtained in the same manner as in Example 3 except that 60 mass % of styrene-based thermoplastic elastomer A-1 and 40 mass % of polyolefin-based thermoplastic elastomer B-1 were measured and mixed well in a pellet state to be used as a raw material.

The obtained net-like structure was formed of linear bodies having a circular cross-sectional shape and a fiber diameter of 0.9 mm. The net-like structure had an apparent density of 0.068 g/cm$^3$, a thickness of flattened surface of 21 mm, a 40° C. compression residual strain of 34.2%, a residual strain after 80,000 times of constant displacement repeated compression of 6.8%, a hysteresis loss of 38.6%, a 25% compression hardness of 15 N/φ50 mm, a 65% compression hardness of 67 N/φ50 mm, and a compression deflection coefficient of 4.5. The properties of the obtained net-like structure are shown in Table 1. The obtained net-like structure satisfied the requirements of the present invention, and had excellent low resilience characteristics, cushioning properties, and durability.

Example 5

A net-like structure was obtained in the same manner as in Example 1 except that 95 mass % of styrene-based thermoplastic elastomer A-1 and 5 mass % of polyolefin-based thermoplastic elastomer B-3 were measured and mixed well in a pellet state to be used as a raw material, the nozzle face-cooling water distance was 20 cm, the take-up speed was 0.8 m/min, and the annealing treatment time was 20 minutes.

The obtained net-like structure was formed of linear bodies having a circular cross-sectional shape and a fiber diameter of 0.5 mm. The net-like structure had an apparent density of 0.095 g/cm$^3$, a thickness of flattened surface of 19 mm, a 40° C. compression residual strain of 24.0%, a residual strain after 80,000 times of constant displacement repeated compression of 3.1%, a hysteresis loss of 77.1%, a 25% compression hardness of 8 N/φ50 mm, a 65% compression hardness of 67 N/φ50 mm, and a compression deflection coefficient of 8.4. The properties of the obtained net-like structure are shown in Table 1. The obtained net-like structure satisfied the requirements of the present invention, and had excellent low resilience characteristics, cushioning properties, and durability.

Example 6

A net-like structure was obtained in the same manner as in Example 1 except that 15 mass % of styrene-based thermoplastic elastomer A-1 and 85 mass % of styrene-based thermoplastic elastomer A-2 were measured and mixed well in a pellet state to be used as a raw material, orifices was shaped to have a triple bridge hollow forming cross section having an outer diameter of 3 mm and an inner diameter of 2.6 mm, the spinning temperature was 250° C., the single-hole discharge rate was 1.5 g/min, the nozzle face-cooling water distance was 16 cm, and the take-up speed was 1.1 m/min.

The obtained net-like structure was formed of linear bodies having a circular cross-sectional shape with a hollow cross section, a hollowness of 32%, and a fiber diameter of 1.0 mm. The net-like structure had an apparent density of 0.103 g/cm$^3$, a thickness of flattened surface of 20 mm, a 40° C. compression residual strain of 33.6%, a residual strain after 80,000 times of constant displacement repeated compression of 6.1%, a hysteresis loss of 67.8%, a 25% compression hardness of 2 N/φ50 mm, a 65% compression hardness of 62 N/φ50 mm, and a compression deflection coefficient of 31.0. The properties of the obtained net-like structure are shown in Table 1. The obtained net-like structure satisfied the requirements of the present invention, and had excellent low resilience characteristics, cushioning properties, and durability.

Example 7

A net-like structure was obtained in the same manner as in Example 6 except that 95 mass % of styrene-based thermoplastic elastomer A-1, 1 mass % of polyolefin-based thermoplastic elastomer B-1, and 4 mass % of polyolefin-based thermoplastic elastomer B-3 were measured and mixed well in a pellet state to be used as a raw material, the spinning temperature was 240° C., the nozzle face-cooling water distance was 20 cm, and the take-up speed was 1.2 m/min.

The obtained net-like structure was formed of linear bodies having a circular cross-sectional shape with a hollow cross section, a hollowness of 27%, and a fiber diameter of 0.8 mm. The net-like structure had an apparent density of 0.092 g/cm$^3$, a thickness of flattened surface of 20 mm, a 40° C. compression residual strain of 18.9%, a residual strain after 80,000 times of constant displacement repeated compression of 3.2%, a hysteresis loss of 80.2%, a 25% compression hardness of 8 N/φ50 mm, a 65% compression hardness of 62 N/φ50 mm, and a compression deflection coefficient of 7.8. The properties of the obtained net-like structure are shown in Table 1. The obtained net-like structure satisfied the requirements of the present invention, and had excellent low resilience characteristics, cushioning properties, and durability.

Example 8

A net-like structure was obtained in the same manner as in Example 6 except that 70 mass % of styrene-based thermoplastic elastomer A-1 and 30 mass % of polyolefin-based thermoplastic elastomer B-2 were measured and mixed well in a pellet state to be used as a raw material, the spinning temperature was 240° C., the nozzle face-cooling water distance was 20 cm, and the take-up speed was 1.0 m/min.

The obtained net-like structure was formed of linear bodies having a circular cross-sectional shape with a hollow cross section, a hollowness of 18%, and a fiber diameter of 1.2 mm. The net-like structure had an apparent density of 0.067 g/cm$^3$, a thickness of flattened surface of 20 mm, a 40° C. compression residual strain of 26.8%, a residual strain after 80,000 times of constant displacement repeated compression of 7.3%, a hysteresis loss of 51.2%, a 25% compression hardness of 10 N/ϕ50 mm, a 65% compression hardness of 75 N/ϕ50 mm, and a compression deflection coefficient of 7.5. The properties of the obtained net-like structure are shown in Table 1. The obtained net-like structure satisfied the requirements of the present invention, and had excellent low resilience characteristics, cushioning properties, and durability.

Comparative Example 1

A net-like structure was obtained in the same manner as in Example 1 except that polyolefin-based thermoplastic elastomer B-2 was used and no annealing treatment was performed.

The obtained net-like structure was formed of linear bodies having a circular cross-sectional shape and a fiber diameter of 0.4 mm. The net-like structure had an apparent density of 0.068 g/cm$^3$, a thickness of flattened surface of 20 mm, a 40° C. compression residual strain of 50.2%, a residual strain after 80,000 times of constant displacement repeated compression of 15.4%, a hysteresis loss of 50.1%, a 25% compression hardness of 48 N/ϕ50 mm, a 65% compression hardness of 111 N/ϕ50 mm, and a compression deflection coefficient of 2.3. The properties of the obtained net-like structure are shown in Table 2. The obtained net-like structure did not satisfy the requirements of the present invention, and had poor low resilience characteristics, cushioning properties, and durability.

Comparative Example 2

A net-like structure was obtained in the same manner as in Example 5 except that styrene-based thermoplastic elastomer A-2 was used, no heat-retaining cylinder was used, the spinning temperature was 240° C., the single-hole discharge rate was 1.0 g/min, the nozzle face-cooling water distance was 30 cm, and the take-up speed was 0.8 m/min.

The obtained net-like structure was formed of linear bodies having a circular cross-sectional shape with a hollow cross section, a hollowness of 27%, and a fiber diameter of 0.6 mm. The net-like structure had an apparent density of 0.094 g/cm$^3$, a thickness of flattened surface of 20 mm, a 40° C. compression residual strain of 43.8%, a residual strain after 80,000 times of constant displacement repeated compression of 17.0%, a hysteresis loss of 48.9%, a 25% compression hardness of 6 N/ϕ50 mm, a 65% compression hardness of 53 N/ϕ50 mm, and a compression deflection coefficient of 8.8. The properties of the obtained net-like structure are shown in Table 2. The obtained net-like structure did not satisfy the requirements of the present invention, and had poor low resilience characteristics, cushioning properties, and durability.

Comparative Example 3

A net-like structure was obtained in the same manner as in Example 6 except that 90 mass % of styrene-based thermoplastic elastomer A-1 and 10 mass % of polyolefin-based thermoplastic elastomer B-1 were measured and mixed well in a pellet state to be used as a raw material, the single-hole discharge rate was 1.0 g/min, no heat-retaining cylinder was used, the nozzle face-cooling water distance was 24 cm, the take-up speed was 0.8 m/min, and no annealing treatment was performed.

The obtained net-like structure was formed of linear bodies having a circular cross-sectional shape with a hollow cross section, a hollowness of 31%, and a fiber diameter of 0.9 mm. The net-like structure had an apparent density of 0.092 g/cm$^3$, a thickness of flattened surface of 20 mm, a 40° C. compression residual strain of 43.3%, a residual strain after 80,000 times of constant displacement repeated compression of 11.8%, a hysteresis loss of 61.1%, a 25% compression hardness of 2 N/ϕ50 mm, a 65% compression hardness of 70 N/ϕ50 mm, and a compression deflection coefficient of 35.0. The properties of the obtained net-like structure are shown in Table 2. The obtained net-like structure did not satisfy the requirements of the present invention, and had poor low resilience characteristics, cushioning properties, and durability.

Comparative Example 4

Spinning was performed in the same manner as in Example 1 except that 40 mass % of styrene-based thermoplastic elastomer A-1 and 60 mass % of polyolefin-based thermoplastic elastomer B-2 were measured and mixed well in a pellet state to be used as a raw material. However, no net-like structure was obtainable.

Comparative Example 5

Spinning was performed in the same manner as in Example 1 except that 40 mass % of styrene-based thermoplastic elastomer A-1 and 60 mass % of polyester-based thermoplastic elastomer C-1 were measured and mixed well in a pellet state to be used as a raw material. However, no net-like structure was obtainable.

TABLE 1

|  | Example 1 | Example 2 | Example 3 | Example 4 | Example 5 | Example 6 | Example 7 | Example 8 |
|---|---|---|---|---|---|---|---|---|
| Thermoplastic resin A-1 (mass %) | 90 | 90 | — | 60 | 95 | 15 | 95 | 70 |
| Thermoplastic resin A-2 (mass %) | — | — | 70 | — | — | 85 | — | — |
| Thermoplastic resin B-1 (mass %) | — | — | 30 | 40 | — | — | 1 | — |
| Thermoplastic resin B-2 (mass %) | 10 | 10 | — | — | — | — | — | 30 |
| Thermoplastic resin B-3 (mass %) | — | — | — | — | 5 | — | 4 | — |
| Thermoplastic resin C-1 (mass %) | — | — | — | — | — | — | — | — |
| Styrene content (mass %) | 17.7 | 17.7 | 28.9 | 11.8 | 18.7 | 38.1 | 18.7 | 13.8 |
| Spinning temperature (° C.) | 240 | 240 | 240 | 240 | 240 | 250 | 240 | 240 |
| Single-hole discharge rate (g/min) | 1.0 | 1.0 | 1.0 | 1.0 | 1.0 | 1.5 | 1.5 | 1.5 |

TABLE 1-continued

|  | Example 1 | Example 2 | Example 3 | Example 4 | Example 5 | Example 6 | Example 7 | Example 8 |
|---|---|---|---|---|---|---|---|---|
| Length of heat-retaining cylinder (mm) | 50 | Nil | 50 | 50 | 50 | 50 | 50 | 50 |
| Nozzle face-cooling water distance (cm) | 24 | 24 | 18 | 18 | 20 | 16 | 20 | 20 |
| Take-up speed (m/min) | 1.0 | 1.0 | 1.0 | 1.0 | 0.8 | 1.1 | 1.2 | 1.0 |
| Annealing temperature (° C.) | 70 | 70 | 70 | 70 | 70 | 70 | 70 | 70 |
| Annealing time (min) | 30 | 30 | 30 | 30 | 20 | 30 | 30 | 30 |
| Fiber diameter (mm) | 0.4 | 0.4 | 0.8 | 0.9 | 0.5 | 1.0 | 0.8 | 1.2 |
| Hollowness (%) | (Solid) | (Solid) | (Solid) | (Solid) | (Solid) | 32 | 27 | 18 |
| Apparent density (g/cm$^3$) | 0.070 | 0.071 | 0.068 | 0.068 | 0.095 | 0.103 | 0.092 | 0.067 |
| Thickness (mm) | 20 | 20 | 21 | 21 | 19 | 20 | 20 | 20 |
| 40° C. compression residual strain (%) | 32.4 | 34.6 | 31.4 | 34.2 | 24.0 | 33.6 | 18.9 | 26.8 |
| Residual strain after 80,000 times of constant displacement repeated compression (%) | 6.2 | 6.9 | 6.5 | 6.8 | 3.1 | 6.1 | 3.2 | 7.3 |
| Hysteresis loss (%) | 66.1 | 67.1 | 46.5 | 38.6 | 77.1 | 67.8 | 80.2 | 51.2 |
| 25% compression hardness (N/φ50 mm) | 5 | 4 | 12 | 15 | 8 | 2 | 8 | 10 |
| 65% compression hardness (N/φ50 mm) | 32 | 30 | 55 | 67 | 67 | 62 | 62 | 75 |
| Compression deflection coefficient | 6.4 | 7.5 | 4.6 | 4.5 | 8.4 | 31.0 | 7.8 | 7.5 |

TABLE 2

|  | Comparative Example 1 | Comparative Example 2 | Comparative Example 3 | Comparative Example 4 | Comparative Example 5 |
|---|---|---|---|---|---|
| Thermoplastic resin A-1 (mass %) | — | — | 90 | 40 | 40 |
| Thermoplastic resin A-2 (mass %) | — | 100 | — | — | — |
| Thermoplastic resin B-1 (mass %) | — | — | 10 | — | — |
| Thermoplastic resin B-2 (mass %) | 100 | — | — | 60 | — |
| Thermoplastic resin B-3 (mass %) | — | — | — | — | — |
| Thermoplastic resin C-1 (mass %) | — | — | — | — | 60 |
| Styrene content (mass %) | 0.0 | 41.3 | 17.7 | 7.9 | 7.9 |
| Spinning temperature (° C.) | 240 | 240 | 250 | 240 | 240 |
| Single-hole discharge rate (g/min) | 1.0 | 1.0 | 1.0 | 1.0 | 1.0 |
| Length of heat-retaining cylinder (mm) | 50 | Nil | Nil | 50 | 50 |
| Nozzle face-cooling water distance (cm) | 24 | 30 | 24 | 24 | 24 |
| Take-up speed (m/min) | 1.0 | 0.8 | 0.8 | No net-like structure obtained | No net-like structure obtained |
| Annealing temperature (° C.) | Nil | 70 | Nil | | |
| Annealing time (min) | Nil | 20 | Nil | | |
| Fiber diameter (mm) | 0.4 | 0.6 | 0.9 | | |
| Hollowness (%) | (Solid) | 27 | 31 | | |
| Apparent density (g/cm$^3$) | 0.068 | 0.094 | 0.092 | | |
| Thickness (mm) | 20 | 20 | 20 | | |
| 40° C. compression residual strain (%) | 50.2 | 43.8 | 43.3 | | |
| Residual strain after 80,000 times of constant displacement repeated compression (%) | 15.4 | 17.0 | 11.8 | | |
| Hysteresis loss (%) | 50.1 | 48.9 | 61.1 | | |
| 25% compression hardness (N/φ50 mm) | 48 | 6 | 2 | | |
| 65% compression hardness (N/φ50 mm) | 111 | 53 | 70 | | |
| Compression deflection coefficient | 2.3 | 8.8 | 35.0 | | |

INDUSTRIAL APPLICABILITY

The present invention can provide a net-like structure having excellent low resilience characteristics, cushioning properties, and durability, which is suitable for: cushion materials used for office chairs, furniture, sofas, beddings such as bed pads and mattresses, seats for vehicles such as trains, automobiles, two-wheeled vehicles, baby buggies, and child safety seats, etc.; portable cushion materials carried in many occasions, such as sleeping bags and mats; and shock-absorbing mats such as floor mats and members for preventing collision and nipping. The present invention therefore greatly contributes to the industrial world.

The invention claimed is:

1. A net structure, comprising:
a three-dimensional random loop bonded structure constituted of a continuous linear body comprising a thermoplastic elastomer composition;
wherein the continuous linear body has a fiber diameter of 0.1-3.0 mm;
wherein the thermoplastic elastomer composition has a styrene content of 10-40 mass %,
wherein the net structure has apparent density of 0.005-0.30 g/cm$^3$ and a 40° C. compression residual strain of less than or equal to 35%,
wherein the thermoplastic elastomer composition is either
(i) an alloy consisting of at least two kinds of styrene-based thermoplastic elastomers different in resin composition, or
(ii) an alloy consisting of a styrene-based thermoplastic elastomer and a polyolefin-based thermoplastic elastomer, the polyolefin-based thermoplastic elastomer being an α-olefin copolymer resin selected from the group consisting of ethylene, propylene, and α-olefin having 4 or more carbons.

2. The net structure according to claim 1, wherein a residual strain after 80,000 times of constant displacement repeated compression is less than or equal to 15%.

3. The net structure according to claim 1, wherein a hysteresis loss is 35-85%, a compression deflection coefficient is 2.5-85.0, and a thickness is 5-300 mm.

4. The net structure according to claim 1, wherein the net structure is used for a cushion material, a shock absorber, or a buffer.

5. The net structure according to claim 2, wherein a hysteresis loss is 35-85%, a compression deflection coefficient is 2.5-85.0, and a thickness is 5-300 mm.

6. The net structure according to claim 2, wherein the net structure is used for a cushion material, a shock absorber, or a buffer.

7. The net structure according to claim 3, wherein the net structure is used for a cushion material, a shock absorber, or a buffer.

8. The net structure according to claim 1,
wherein the thermoplastic elastomer composition is the alloy of the styrene-based thermoplastic elastomer and the polyolefin-based thermoplastic elastomer, and
wherein the content of the styrene-based thermoplastic elastomer in the alloy is greater than the content of the polyolefin-based thermoplastic elastomer in the alloy.

9. The net structure according to claim 8, wherein the polyolefin-based thermoplastic elastomer is 1-30 mass % of the thermoplastic elastomer composition.

10. The net structure according to claim 1, wherein the thermoplastic elastomer composition includes a styrene-based thermoplastic elastomer having a styrene content of greater than or equal to 40 wt %.

* * * * *